United States Patent
Hamer et al.

(10) Patent No.: US 8,907,540 B2
(45) Date of Patent: Dec. 9, 2014

(54) ELECTRIC MACHINE WITH INSULATOR SPACER

(75) Inventors: Colin Hamer, Noblesville, IN (US); Bradley D. Chamberlin, Pendleton, IN (US); Cary Ramey, Greenwood, IN (US)

(73) Assignee: REMY Technologies, L.L.C., Pendleton, IN (US)

( * ) Notice: Subject to any disclaimer, the term of this patent is extended or adjusted under 35 U.S.C. 154(b) by 405 days.

(21) Appl. No.: 13/300,463

(22) Filed: Nov. 18, 2011

(65) Prior Publication Data

US 2013/0127288 A1 May 23, 2013

(51) Int. Cl.
*H02K 3/04* (2006.01)

(52) U.S. Cl.
USPC .......................................................... 310/201

(58) Field of Classification Search
USPC .................... 310/195, 201, 202, 203, 207
See application file for complete search history.

(56) References Cited

U.S. PATENT DOCUMENTS

| | | | |
|---|---|---|---|
| 5,280,206 A | 1/1994 | Ando et al. | |
| 5,828,147 A | 10/1998 | Best | |
| 6,362,544 B2 | 3/2002 | Johnston et al. | |
| 6,369,473 B1 | 4/2002 | Baumeister | |
| 6,545,243 B1 | 4/2003 | Sorg et al. | |
| 6,661,146 B2 | 12/2003 | Oohashi | |
| 6,700,282 B2 | 3/2004 | Mori et al. | |
| 6,825,586 B2 | 11/2004 | Edrington | |
| 6,894,417 B2 | 5/2005 | Cai et al. | |
| 7,034,428 B2 | 4/2006 | Cai et al. | |
| 7,256,364 B2 | 8/2007 | Gentry et al. | |
| 7,348,705 B2 | 3/2008 | Cai et al. | |
| 7,622,843 B2 | 11/2009 | Cai | |
| 7,687,954 B2 | 3/2010 | Neet et al. | |
| 7,788,790 B2 | 9/2010 | Neet | |
| 7,788,791 B2 | 9/2010 | Hara | |
| 7,808,137 B2 | 10/2010 | Neet | |
| 7,808,148 B2 | 10/2010 | Neet | |
| 7,911,105 B2 | 3/2011 | Neet | |
| 2003/0214190 A1 | 11/2003 | Congdon et al. | |
| 2005/0206263 A1 | 9/2005 | Cai et al. | |
| 2008/0042508 A1 | 2/2008 | Cai et al. | |
| 2009/0100665 A1* | 4/2009 | Berger et al. | 29/596 |
| 2011/0175472 A1 | 7/2011 | Koike et al. | |

FOREIGN PATENT DOCUMENTS

| | | |
|---|---|---|
| JP | H0-8501437 A | 2/1996 |
| JP | H0-956101 A | 2/1997 |
| JP | 2001-186705 A | 7/2001 |
| JP | 3497620 | 2/2004 |
| JP | 2008-301620 A | 12/2008 |
| WO | 94/06194 A1 | 3/1994 |

OTHER PUBLICATIONS

Machine Translation for JP 2008-301620 Apr. 24, 2014.*
International Search Report and Written Opinion dated Feb. 28, 2013 in corresponding International Application No. PCT/US2012/065569.

* cited by examiner

*Primary Examiner* — Hanh Nguyen
(74) *Attorney, Agent, or Firm* — Faegre Baker Daniels LLP

(57) ABSTRACT

A stator assembly for an electric machine including a stator core supporting a plurality of electrical conductors. A plurality of elongated insulator spacers is interwoven between the conductors proximate connection ends thereof in axially spaced relation to the stator core.

21 Claims, 8 Drawing Sheets

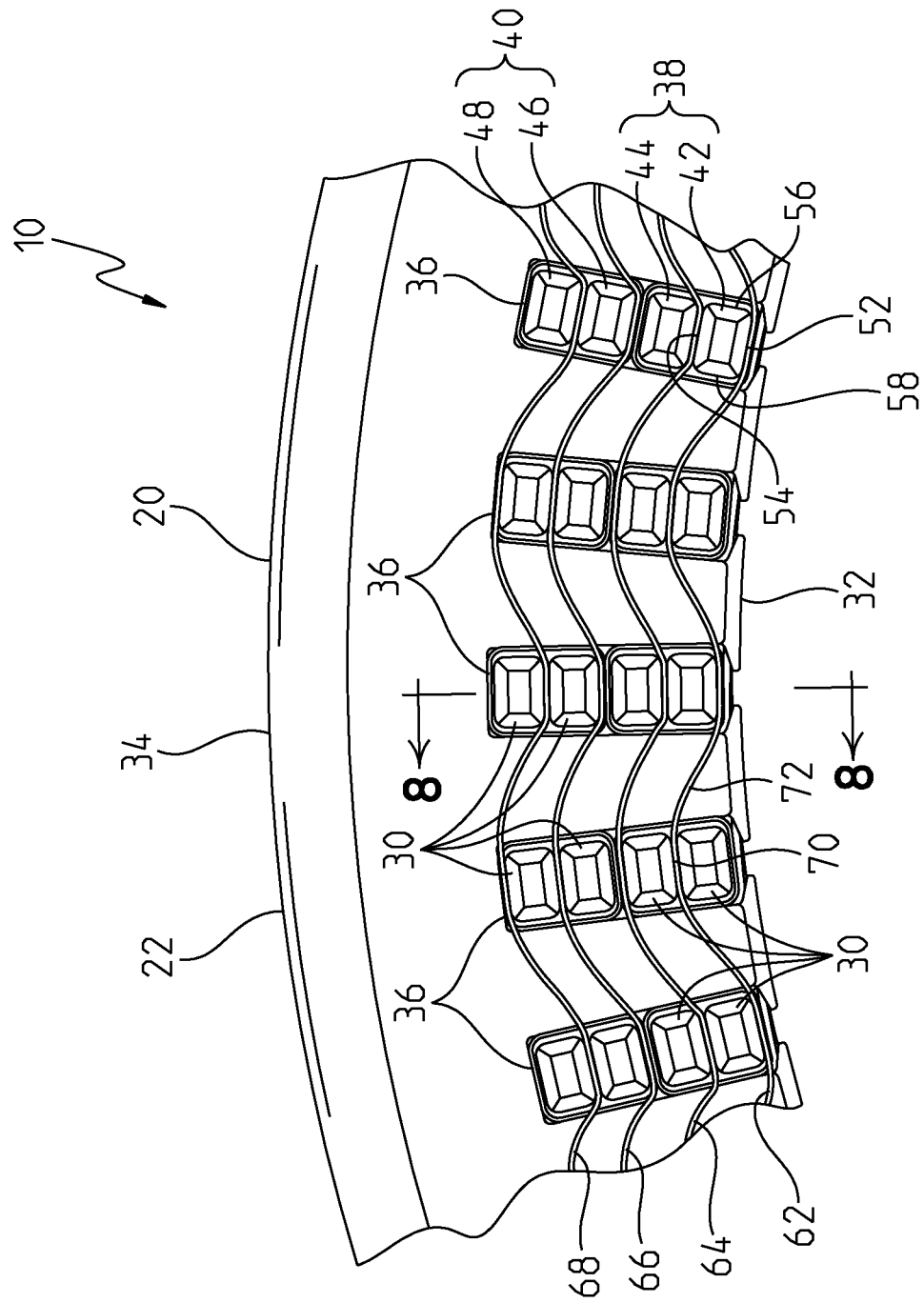

ELECTRIC MACHINE WITH INSULATOR SPACER

BACKGROUND AND SUMMARY OF THE INVENTION

The present invention relates generally to electric machines and, more particularly, to insulator spacers provided proximate the connection ends of conductors above a stator core.

Electric machines may be used for a variety of applications, including in connection with automobile power trains. For example, a conventional automobile may use an electric machine as a starting motor for an internal combustion engine, or as an alternator to generate electricity and deliver power to vehicle accessories and/or charge a vehicle's battery. It is also known to use electric machines as traction motors, for example with hybrid/electric vehicles.

It is known in such electric machines to manufacture a stator assembly by using pre-formed conductors. To complete the electrical circuit, the free ends of the conductor are bent or twisted for alignment and then joined together in a particular arrangement. The twisting process, due to complex geometry and the number of conductors, may yield significant variations in spacing from one conductor to another conductor. Inadvertent electric contact between the various conductors may cause the stator assembly to not function properly. In order to accommodate these dimensional variations, the degree of conductor twisting may be minimized, resulting in an increased length of the motor and/or a reduction of power density.

The present disclosure relates to elongated insulator spacers woven between various conductors at the free ends thereof prior to twisting in a pattern that protects the conductors from touching or damaging adjacent conductors. As such, the overall length of the motor may be reduced, or the power may be increased in the same length. Further, such insulator spacers improve the durability and resultant life of the electric machine by preventing potentially damaging contact between adjacent conductors.

According to an illustrative embodiment of the present disclosure, a stator assembly includes a stator core including a sidewall extending about a longitudinal axis. A first conductor layer includes a plurality of circumferentially spaced electrical conductors defining an annular ring, and a second conductor layer including a plurality of circumferentially spaced electrical conductors defining an annular ring, the second conductor layer being positioned radially outwardly from the first conductor layer. A first insulator spacer formed of an electrically non-conductive material is interwoven between the first and second conductive layers by extending alternately between outer and inner surfaces of circumferentially adjacent electrical conductors of the first conductor layer. A second insulator spacer formed of an electrically non-conductive material is interwoven between the first and second conductive layers by extending alternately between outer and inner surfaces of circumferentially adjacent electrical conductors of the second conductor layer.

According to a further illustrative embodiment of the present disclosure a stator assembly including a stator core, and a plurality of electrical conductors supported within the stator core and extending axially between opposing first and second end portions, the first and second end portions positioned outside of the stator core, the plurality of conductors being arranged in a plurality of concentric layers. A first elongated insulator spacer is interwoven in a substantially sinusoidal path between the plurality of conductors proximate the second ends outside of the stator core, the insulator spacer being formed of an electrically non-conductive material.

According to another illustrative embodiment of the present disclosure a method of forming a stator assembly of an electric machine includes the steps of providing a stator core having a plurality of slots extending axially between an insertion end and an opposing connection end, and inserting a plurality of electrical conductors within the slots of the stator core. The method further includes the steps of positioning an insulator spacer in axially spaced relation to the stator core proximate the connection end of the stator core, the insulator spacer formed of an electrically non-conductive material, and aligning the insulator spacer with spaces intermediate the plurality of electrical conductors. The method also includes moving the insulator spacer toward the connection end of the stator core such that the insulator spacer is pushed into the spaces intermediate the plurality of electrical conductors and interwoven in a substantially sinusoidal path between the electrical conductors.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 6A is a partial top plan view of FIG. 2;

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
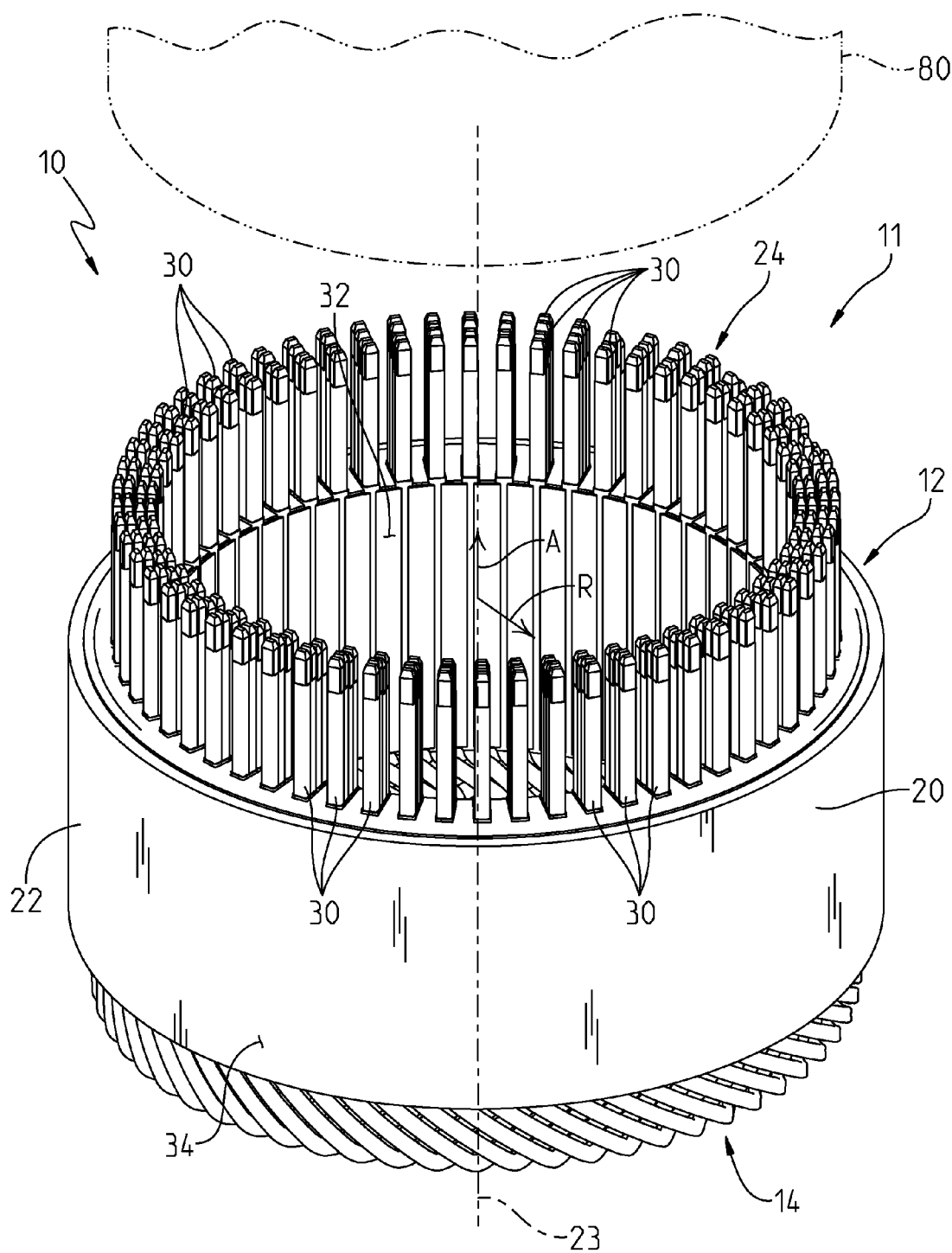
FIG. 1 is a perspective view of an illustrator assembly with individual conductors inserted within a stator core and prior to bending or twisting of the free connector ends.

Referring initially to FIG. 1, an illustrative stator assembly 10 of an electric machine 11 prior to final assembly is shown. The stator assembly 10 includes an insertion end 14 and an opposing connection end 12. The electric machine 11 when used as a motor (such as a starting motor or traction motor) includes the stator assembly 10 operably coupled to a rotor (not shown) through magnetic fields in order to convert electric energy to mechanical energy. In a similar manner, the electric machine 11 may also be used as an alternator or generator to generate electricity by converting mechanical energy to electric energy through magnetic fields and delivering power, for example, to vehicle accessories and/or to charge a vehicle's battery.

The stator assembly 10 illustratively includes a stator core or stack 20, and a plurality of electrical conductors, or windings 30. The stator core 20 includes a cylindrical side wall 22 extending about a longitudinal axis 23 and defining an open center portion 24. An axial direction A extends through the open center portion 24 between the insertion end 14 and the opposing or connection end 12 of the stator assembly 10, and a radial direction R extends perpendicular to the axial direction A away from the longitudinal axis 23 toward the side wall 22. In certain illustrative embodiments, the cylindrical side wall 22 may include one or more lamination stacks or layers (not shown). In certain illustrative side embodiments, the cylindrical side wall 22 may be comprised of silicone steel, which reduces hysteresis and eddy current losses during the operation of the electric machine 11. Alternatively, the cylindrical side wall 22 may be comprised of a solid powdered metal body. Furthermore, the stator core 20 may include a metal (e.g., steel) frame (not shown).

The cylindrical side wall 22 of the stator core 20 extends between a circumferential inner surface 32 and a circumferential outer surface 34, and illustratively includes a plurality of circumferentially-spaced, axially-extending slots 36 (FIG. 6A) through which the conductors 30 are received. The illustrative stator core 20 of FIGS. 1-3 includes 60 (sixty) slots 36. Openings to the stator slots 36 are illustratively provided through the inner surface 32 of the stator core 20, as well as the insertion end 14 and the connection end 12 of the stator core 20.

Illustratively, the slots 36 each support at least a portion of the conductors 30, arranged in armature winding sets, including first (or inner) and second (or outer) winding sets 38 and 40, respectively. More particularly, each slot 36 illustratively includes a portion of both winding sets, including first winding set 38 and second winding set 40. The first winding set 38 in each slot 36 includes two conductors 30 of one phase, and the second winding set 40 in each slot 36 includes two conductors 30 of another phase. Similarly, each of the other slots 36 in the illustrative embodiment also comprises two conductors 30 of one phase and two conductors 30 of another phase. In other illustrative embodiments, it is also possible that each of the slots 36 contain all four conductors 30 of the same phase. The illustrative winding arrangement discloses herein is a three-phase winding arrangement, including phases A, B, and C. However, it should be appreciated that the present disclosure may be applied to other multi-phase winding arrangements.

The conductors 30 are illustratively formed of an electrically conductive material, such as copper, having a rectangular cross-section, and are used to form the armature winding sets 38 and 40. With reference to FIGS. 1-6A, the conductors 30 are illustratively arranged in four concentric rings or layers, with a first layer 42 positioned closest to the inner surface 32 of the stator core 20, followed by a second layer 44 positioned radially outwardly from the first layer 42, a third layer 46 positioned radially outwardly from the second layer 44, and a fourth layer 48 positioned radially outwardly from the third layer 46 and positioned closest to the outer surface 34 of the stator core 20. The first and second layers 42 and 44 define the first winding set 38, while the third and fourth layers 46 and 48 define the second winding set 40. While rectangular cross-section conductors 30 may be utilized in order to appropriate the advantages of semi-closed or fully-closed armature slots with a high slot fill ratio (SFR), other conductors (e.g., circular cross-section) may be substituted therefor.

With reference to FIGS. 6A-9, each conductor 30 illustratively includes a radial inner surface 52 and a radial outer surface 54. Opposing circumferential side surfaces 56 and 58 connect the inner and outer surfaces 52 and 54, defining a substantially rectangular cross-section. Each conductor 30 includes a first or turn end portion 59 positioned external to the stator core 20 adjacent to the insertion end 14, and an opposing second, connection or weld end portion 60 positioned external to the stator core 20 adjacent the connection end 12. As further detailed herein, the weld end portions 60 provide electrical communication between selected conductors 30 to define the winding sets 38 and 40.

A plurality of electrical insulator spacers 62, 64, 66, and 68 are illustratively supported adjacent the connection ends of the conductors 30 in substantially parallel paths extending within planes positioned substantially perpendicular to the longitudinal axis 23 of the stator core 20. As further detailed herein, the insulator spacers 62, 64, 66, and 68 are illustratively interwoven between the conductor layers 42, 44, 46, 48 for electrically insulating the connector end portions 60 of each electrical conductor 30 from each radially and circumferentially adjacent conductor 30.

In the illustrative embodiment shown in FIG. 6A, a first insulator spacer 62 is formed of an electrically non-conductive material and is interwoven between the first and second conductive layers 42 and 44 by extending alternately between inner and outer surfaces 52 and 54 of circumferentially adjacent electrical conductors 30 of the first conductor layer 42. A second insulator spacer 64 formed of an electrically conductive material is interwoven between the first and second conductive layers 42 and 44, and between the second and third conductive layers 44 and 46, by extending alternately between the inner and outer surfaces 52 and 54 of circumferentially adjacent electrical conductors of the second conductor layer 44. A third insulator spacer 66 formed of an electrically non-conductive material is interwoven between the second and third conductive layers 44 and 46, and between the third and fourth conductive layers 46 and 48, by extending alternately between inner and outer surfaces 52 and 54 of circumferentially adjacent electrical conductors 30 of the third conductor layer 46. Finally, a fourth insulator spacer 68 formed of an electrically non-conductive material is interwoven between the third and fourth conductive layers 46 and 48 by extending alternately between inner and outer surfaces 52 and 54 of circumferentially adjacent electrical conductors 30 of the fourth conductor layer 48.

Figure 6B:
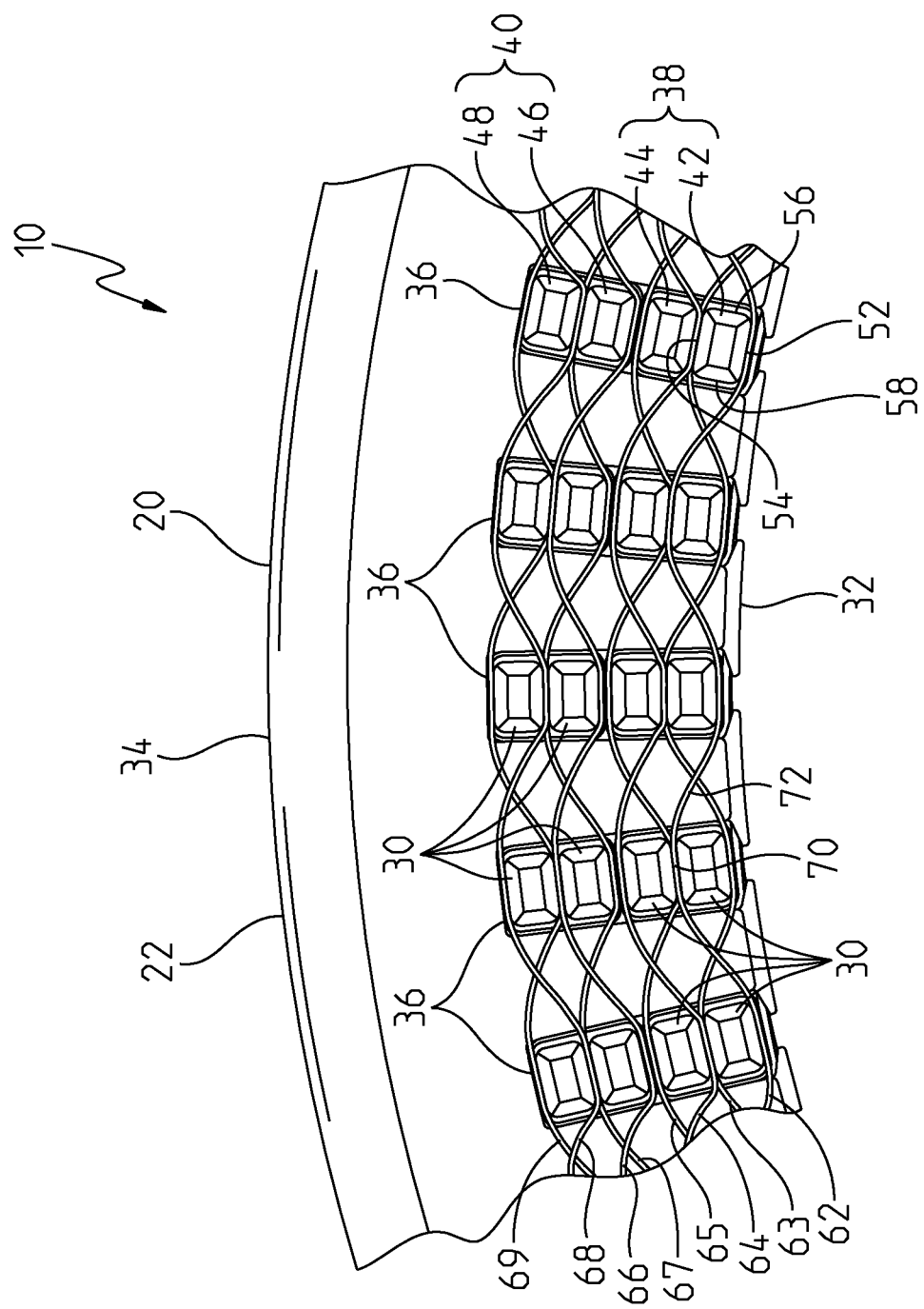
FIG. 6B is a partial top plan view similar to FIG. 6A, showing the insulator spacers in a further interwoven arrangement.
Figure 7:
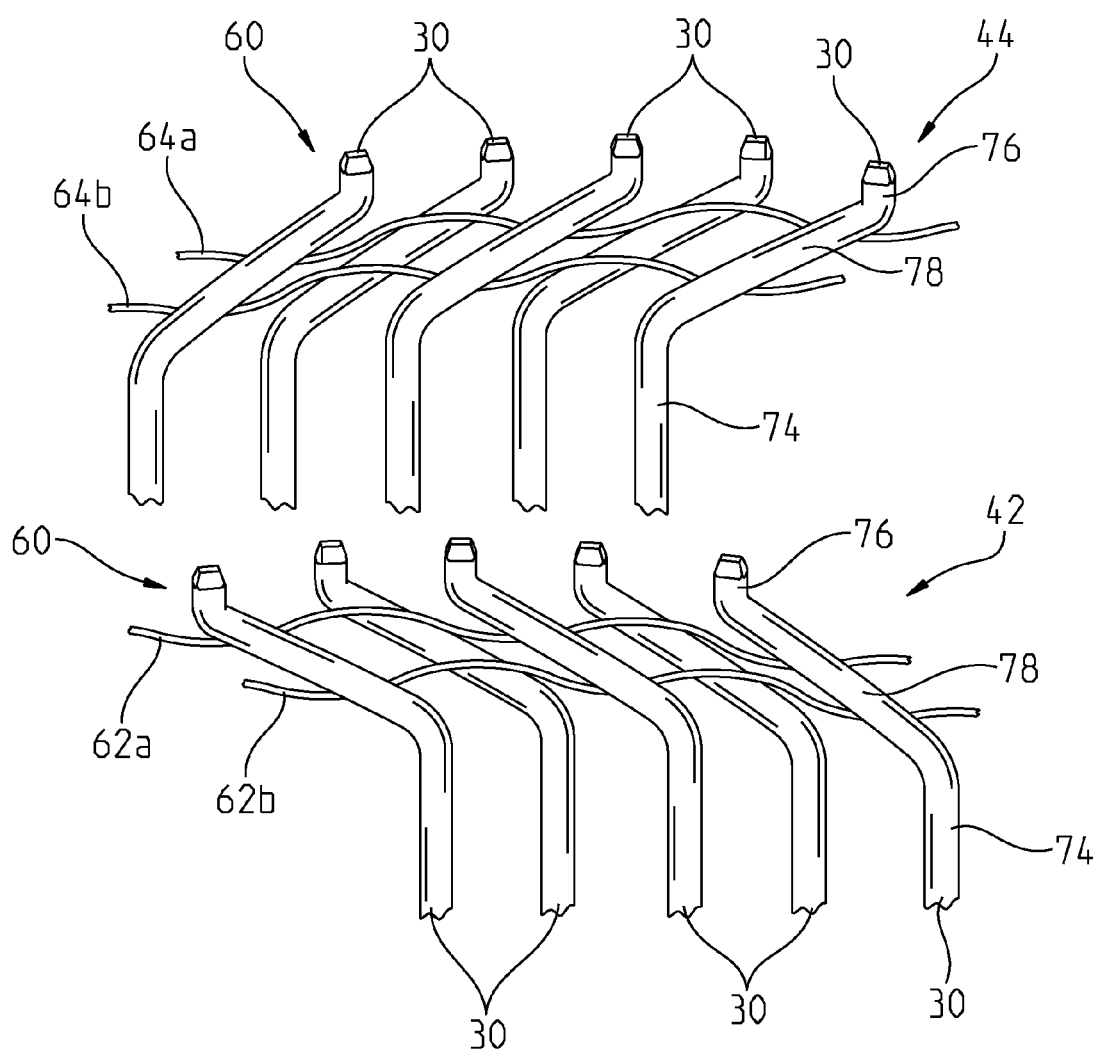
FIG. 7 is a partially exploded perspective view of the inner layers of FIG. 4, showing the interwoven arrangement of the insulator spacers between adjacent conductors of the inner layers.

With further reference to FIGS. 6 and 7, the plurality of insulator spacers 62, 64, 66, 68 provide electrical insulation spacing in both radial and circumferential directions between each adjacent conductor 30. More particularly, each insulator spacer 62, 64, 66, 68 is interwoven between the electrical conductors 30 of a particular layer 42, 44, 46, 48, respectively. In the illustrative embodiment, each insulator spacer 62, 64, 66, 68 follows a zigzag and illustratively sinusoidal path between inner and outer surfaces 52 and 54 of circumferentially adjacent electrical conductors 30 of a particular layer 42, 44, 46, 48. A first portion 70 of each insulator spacer 62, 64, 66, 68 forms a radial insulating member, while a second portion 72 of each insulator spacer 62, 64, 66, 68 forms a circumferential insulator member (FIG. 6).

With further reference to FIGS. 6A-6B, the insulator spacers 62, 64, 66, 68 may be interwoven in a variety of manners between the conductors 30. For example, each insulator spacer 62, 64, 66, 68 may span one or more conductors in the circumferential and/or radial direction in a single cycle of its weaving pattern. For example, first insulator spacer 62 may extend alternately between inner and outer surfaces 52 and 54 of circumferentially adjacent electrical conductors 30 of the first and second conductor layers 42 and 44, respectively. In the illustrative embodiment shown in FIG. 6B, insulator spacers 63, 65, 67, 69 may crisscross insulator spacers 62, 64, 66, 68. In other words, insulator spacers 62 and 63 may alternate paths between inner and outer surfaces 52 and 54 of conductors 30 of the first layer 42, and insulator spacers 64 and 65 may alternate paths between inner and outer surfaces 52 and 54 of conductors 30 of the second layer 44. Similarly, insulator spacers 66 and 67 may alternate paths between inner and outer surfaces 52 and 54 of conductors 30 of the third layer 46, while insulator spacers 68 and 69 may alternate paths between inner and outer surfaces 52 and 54 of conductors 30 of fourth layer 48.

As described above, the plurality of electrical conductors 30 includes opposing end portions 59 and 60 positioned axially outwardly from the stator core 20. The insulator spacers 62, 64, 66, 68 are positioned axially outwardly from the stator core 20 adjacent the weld end portions 60 of the electrical conductors 30. With reference to FIG. 7, the weld end portions 60 of the electrical conductors 30 are bent to include an inner axial leg 74, an outer axial leg 76, and an inclined portion 78 connecting the inner and outer axial legs 74 and 76. Each of the insulator spacers 62, 64, 66, 68 is configured to engage the inclined portions 78 of the respective electrical conductors 30.

Figure 2:
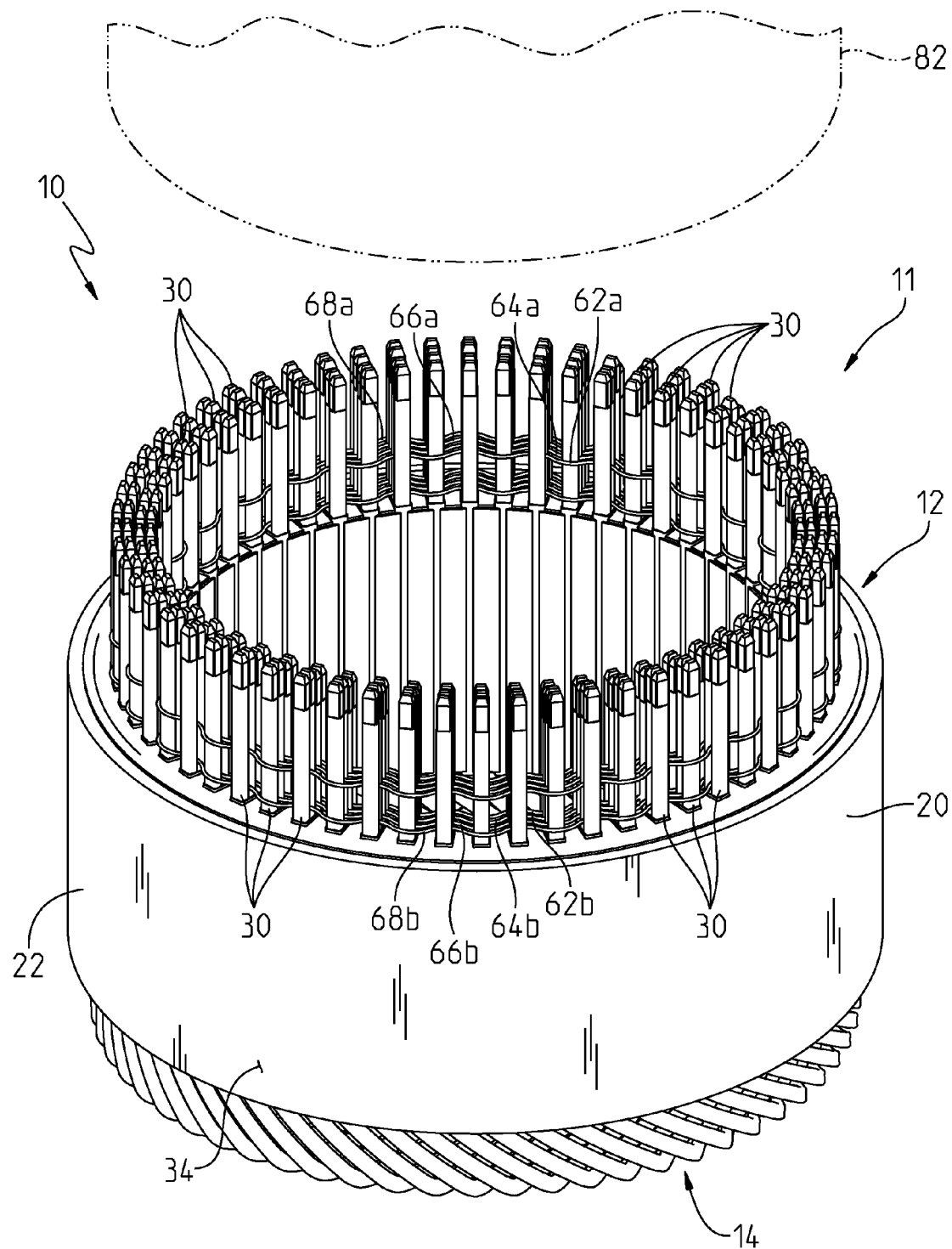
FIG. 2 is a perspective view similar to FIG. 1, showing insulator spacers interwoven between adjacent conductors.
Figure 3:
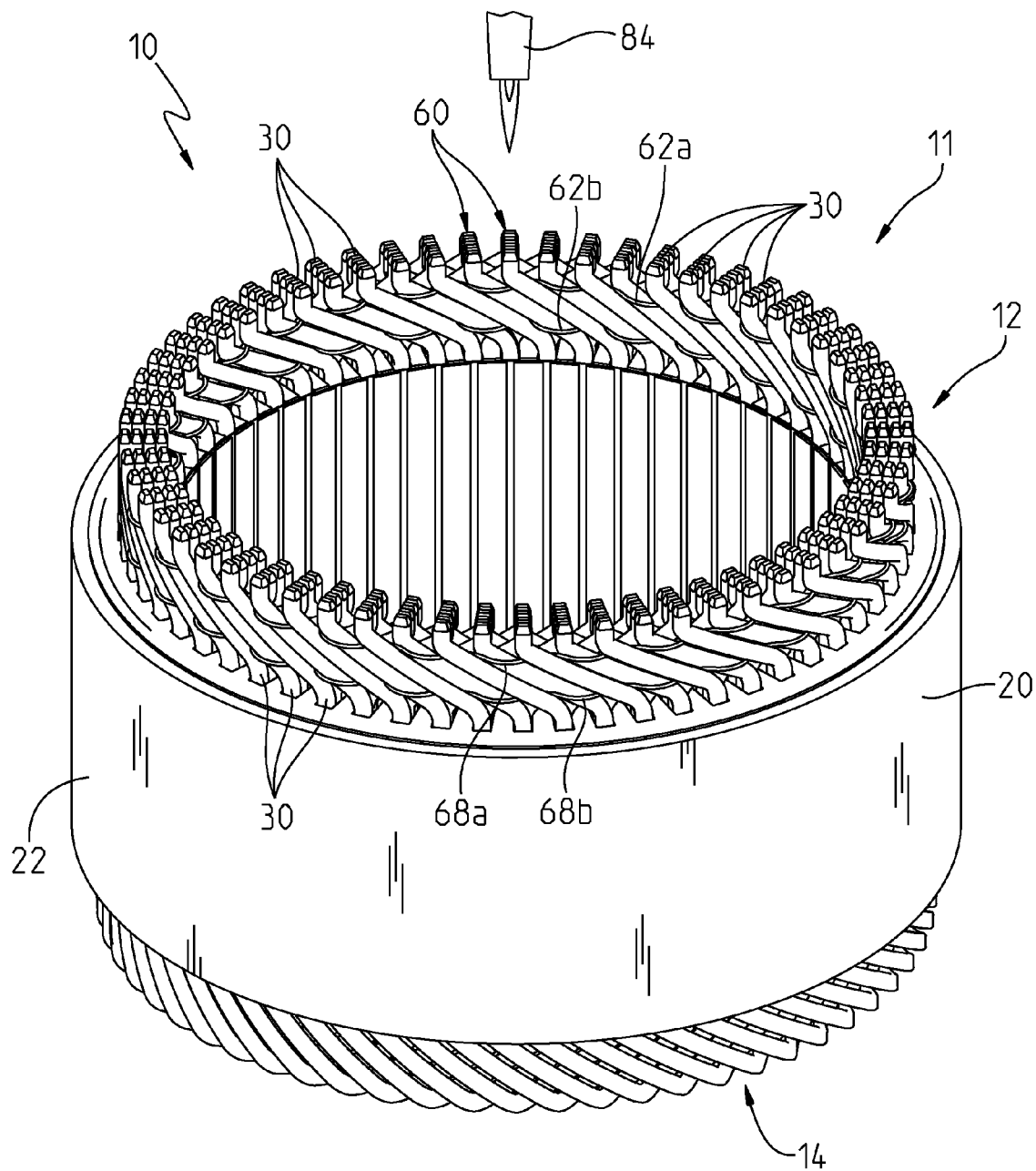
FIG. 3 is a perspective view similar to FIG. 2, showing the connector ends of the conductors in a bent or twisted configuration.
Figure 4:
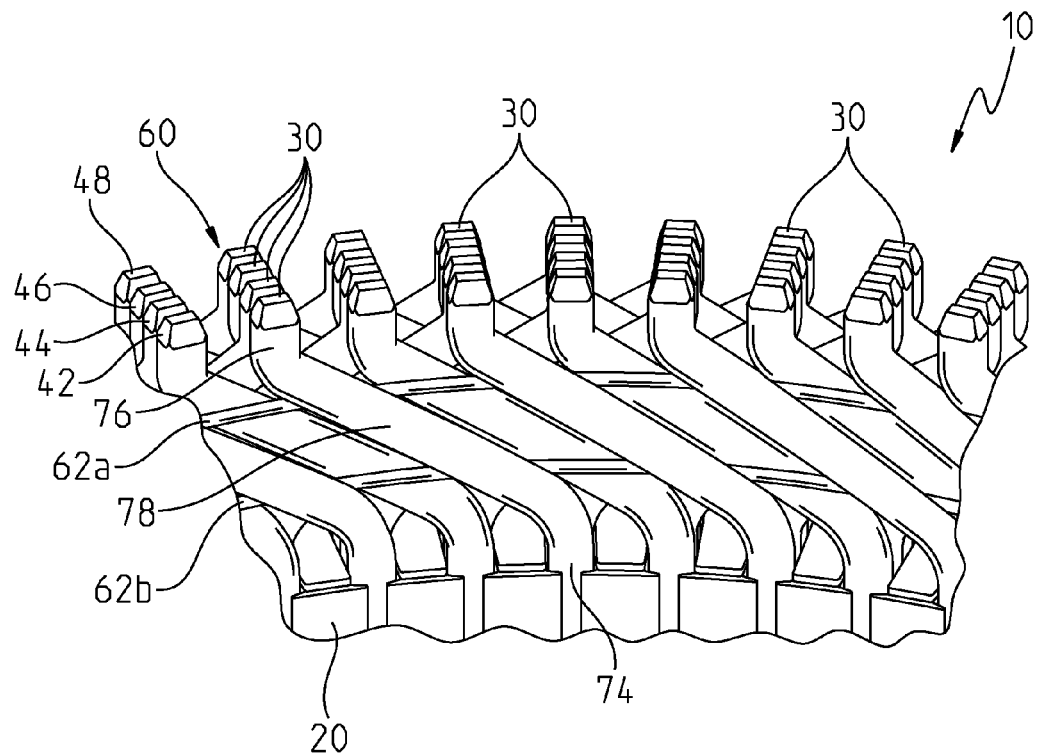
FIG. 4 is a partial inner perspective view showing insulator spacers in a round cord configuration interwoven between adjacent conductors.
Figure 5:
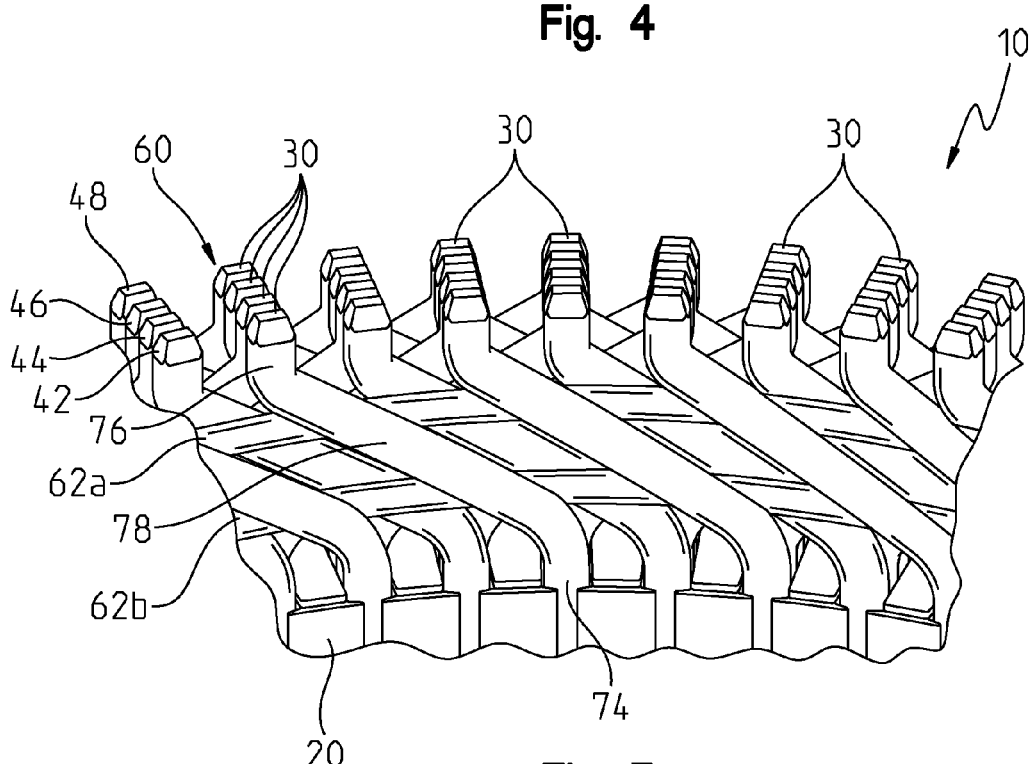
FIG. 5 is an inner perspective view similar to FIG. 4 showing the insulator spacers in a planar strip configuration interwoven between adjacent conductors.

Illustratively, each of the first, second, third, and fourth insulator spacers 62, 64, 66, 68 may include upper and lower insulator spacers. With reference to FIGS. 2, 3, and 7, an upper first insulator spacer 62a is positioned above a lower first insulator spacer 62b, both of which are configured to engage the inclined portions 78 of the conductors of the first layer 42. An upper second insulator spacer 64a is positioned above a lower second insulator spacer 64b, both of which are configured to engage the inclined portions 78 of the conductors 30 of the second layer 44. Similarly, an upper third insulator spacer 66a is positioned above a lower third insulator spacer 66b, both of which are configured to engage the inclined portions 78 of the conductors 30 of the third layer 46. Finally, an upper fourth insulator spacer 68a is positioned above a lower fourth insulator spacer 68b, both of which are configured to engage the inclined portions 78 of the conductors 30 of the fourth layer 48. Illustratively, the upper insulator spacers 62a, 64a, 66a, 68a are positioned within a common upper plane while the lower insulator spacers 62b, 64b, 66b, 68b are positioned within a common lower plane.

Figure 8:
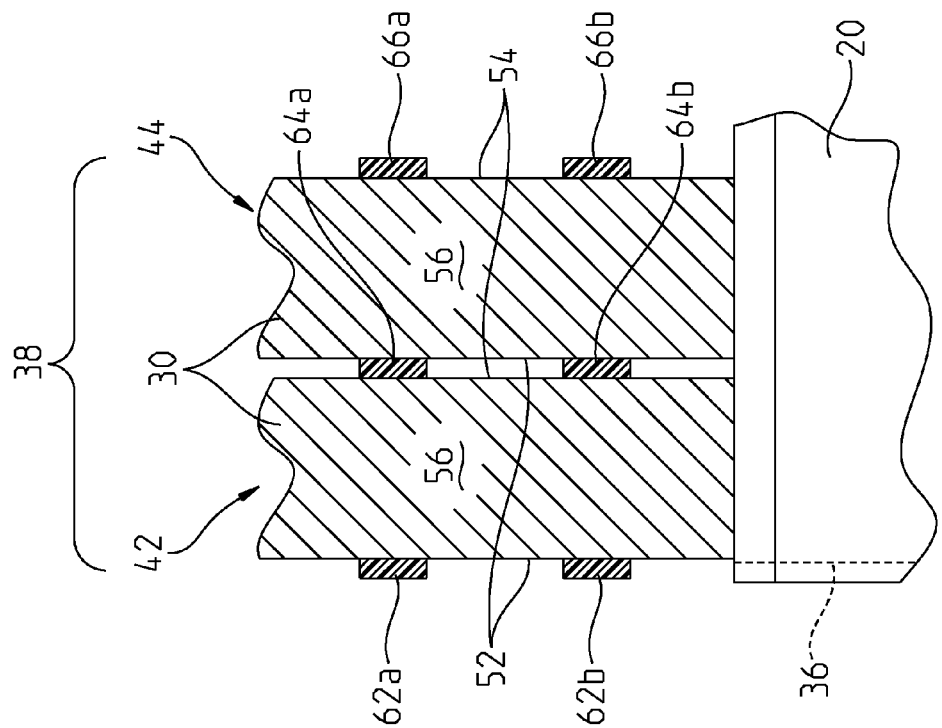
FIG. 8 is a partial cross-sectional view taken along line 8-8 of FIG. 6, showing relative positioning of cord insulator spacers relative to a pair of conductors of the inner layers.
Figure 9:
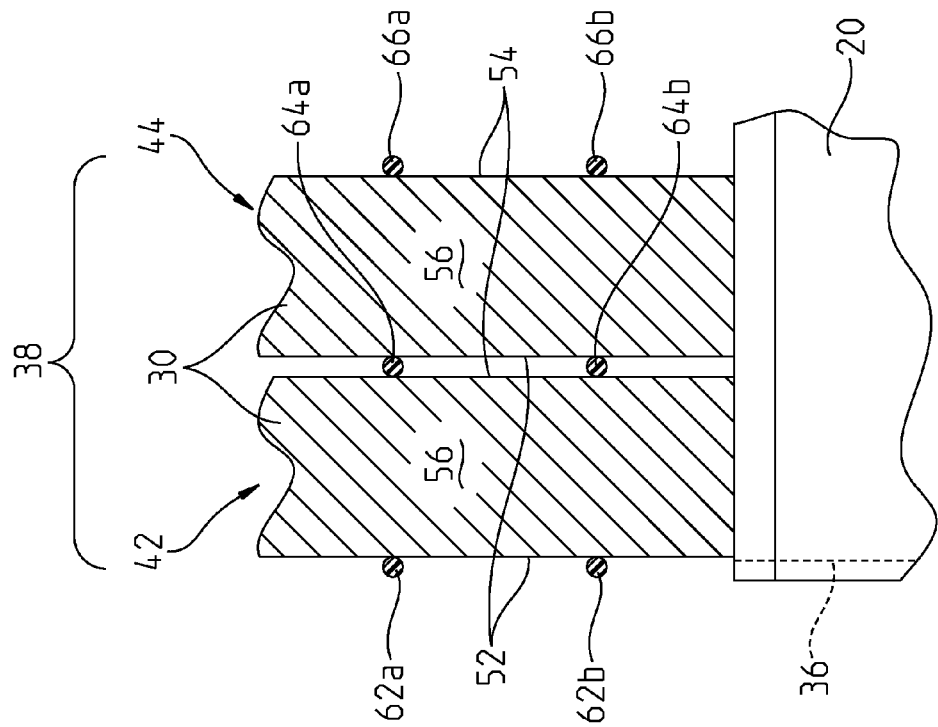
FIG. 9 is a partial cross-sectional view similar to FIG. 8, showing relative positioning of strip insulator spacers relative to a pair of conductors of the inner layers.

With reference to FIGS. 8 and 9, the insulator spacers 62, 64, 66, 68 may take different forms or configurations. In the illustrative configurations, the insulator spacers 62, 64, 66, 68 are formed of continuous, endless loops extending circumferentially 360 degrees proximate the connection end 12 of the stator core 20. FIG. 8 illustrates insulator spacers 62, 64, 66, 68 each formed of an interwoven round cord having a circular cross-section, while FIG. 9 illustrates insulator spacers 62, 64, 66, 68 each formed of a planar strip having a rectangular cross section. In both configurations, the insulator spacers 62, 64, 66, 68 may be formed of any electrically non-conductive or insulating material through conventional manufacturing processes (machining, molding, extruding, etc.). In certain embodiments electrically insulating fibers, such as glass, polymer, or aramide (aromatic polyamide) fibers, are woven together to form the desired cross-sectional shape (e.g., round cord or rectangular strip). Aramid fibers may include meta-aramid (Nomex®) and/or para-aramid (Kevlar®) fibers.

An illustrative method of forming the stator assembly 10 detailed herein includes the steps of providing the stator core 20 with the plurality of slots 36 extending axially between opposing insertion and connection ends 12 and 14. A plurality of electrical conductors 30 are inserted within the slots 36 of the stator core 20 resulting in the assembly shown in FIG. 1. The inserting step illustratively includes inserting a plurality of circumferentially spaced electrical conductors 30 in an annular ring defining a first conductive layer 42, inserting a plurality of circumferentially spaced electrical conductors 30 in an annular ring defining a second conductive layer 44 positioned radially outwardly from the first conductive layer 42, inserting a plurality of circumferentially spaced electrical conductors 30 in an annular ring defining a third conductive layer 46 positioned radially outwardly from the second conductive layer 44, and inserting a plurality of circumferentially spaced electrical conductors 30 in an annular ring defining a fourth conductive layer 48 positioned radially outwardly from the third conductive layer 46.

Next, a holding tool 80 receives and positions the plurality of insulator spacers 62, 64, 66, 68 in axially spaced relation to the stator core 20 proximate the connection end 12. The holding tool 80 then aligns the insulator spacers 62, 64, 66, 68 with spaces intermediate the plurality of electrical conductors 30 to define the plurality of parallel sinusoidal paths detailed herein. The aligning step further includes aligning the first insulator spacer 62 to extend alternately between inner and outer surfaces 52 and 54 of circumferentially adjacent electrical conductors 30 of the first conductive layer 42, aligning the second insulator spacer 64 to extend between inner and outer surfaces 52 and 54 of circumferentially adjacent electrical conductors 30 of the second conductive layer 44, aligning the third insulator spacer 66 to extend between inner and outer surfaces 52 and 54 of circumferentially adjacent electrical conductors 30 of the third conductive layer 46, and aligning the fourth insulator spacer 68 to extend between inner and outer surfaces 52 and 54 of circumferentially adjacent electrical conductors 30 of the fourth conductive layer 48.

The holding tool 80 next moves the insulator spacers 62, 64, 66, 68 toward the connection end 12 of the stator core 20 such that the insulator spacers 62, 64, 66, 68 are pushed into spaces (alternating circumferential and radial spaces) intermediate the plurality of electrical conductors 30, and interwoven into substantially sinusoidal paths between the electrical conductors 30. The holding tool 80 illustratively locates the plurality of insulator spacers 62, 64, 66, 68 at a depth appropriate such that the insulator spacers 62, 64, 66, 68 contact the inclined portions 78 of the respective electrical conductors 30.

Next, a forming tool 82 as shown in FIG. 2 may be aligned above the sub-assembly for bending or twisting the connector end portions 60 of the electrical conductors 30. The bending step includes bending or twisting connector end portions 60 of the electrical conductors 30 such that they include inner axial leg 74, outer axial leg 76, and inclined portion 78. As noted above, the insulator spacers 62, 64, 66, 68 have been pre-set such that they align with the inclined portions 78 of the respective electrical conductors 30.

Radially adjacent connection end portions 60 of the electrical conductors 30 of the first and second conductive layers 42 and 44 are illustratively electrically connected together, and radially adjacent connection end portions 60 of the electrical conductors 30 of the first and fourth conductor layers 46 and 48 are illustratively electrically connected together. Such electrical connections are typically formed through a welding process. Other conventional coupling methods may be substituted for welding, such as soldering or crimping. For example, a welding torch 84 such as a plasma torch or other conventional heating device for melting and welding metals, may be positioned adjacent the connection end portions 60 of the conductors 30 to be welded together. A holding device (not shown) may be utilized to hold the adjacent connection end portions 60 during the welding process. The torch 84 welds together the end portions 60 of the conductors 30 in order to form a desired weld joint.

Although the invention has been described in detail with reference to certain preferred embodiments, variations and modifications exist within the spirit and scope of the invention as described and defined in the following claims.

The invention claimed is:

1. A stator assembly including:
   a stator core including a sidewall extending about a longitudinal axis;
   a first conductor layer including a plurality of circumferentially spaced electrical conductors defining an annular ring;
   a second conductor layer including a plurality of circumferentially spaced electrical conductors defining an annular ring, the second conductor layer being positioned radially outwardly from the first conductor layer;
   a first insulator spacer formed of an electrically non-conductive material and interwoven between the first and second conductive layers by extending alternately between outer and inner surfaces of circumferentially adjacent electrical conductors of the first conductor layer; and
   a second insulator spacer formed of an electrically non-conductive material and interwoven between the first and second conductive layers by extending alternately between outer and inner surfaces of circumferentially adjacent electrical conductors of the second conductor layer.

2. The stator assembly of claim 1, wherein the plurality of electrical conductors include opposing turn and connection end portions positioned axially outwardly from the stator core, the first and second insulator spacers being positioned axially outwardly from the stator core adjacent the connection end portions of the electrical conductors.

3. The stator assembly of claim 2, wherein:
   the connection end portions of the electrical conductors are bent to include an inner axial leg, an outer axial leg, and an inclined portion connecting the inner axial leg and the outer axial leg; and
   the first and second insulator spacers configured to engage the inclined portions of the respective electrical conductors.

4. The stator assembly of claim 1, wherein the insulator spacers are formed of a cord of electrically insulating material having a substantially circular cross-section.

5. The stator assembly of claim 1, wherein the insulator spacers are formed of a strip of electrically insulating material having a substantially rectangular cross-section.

6. The stator assembly of claim 1, wherein the insulator spacers are formed of at least one of glass, polymer, and para-aramide fibers.

7. The stator assembly of claim 1, wherein the insulator spacers follow a substantially sinusoidal path within a plane extending substantially perpendicular to the longitudinal axis of the stator core.

8. The stator assembly of claim 1, further comprising
   a third conductor layer including a plurality of circumferentially spaced electrical conductors defining an annular ring, the third conductor layer being positioned radially outwardly from the second conductor layer;
   a fourth conductor layer including a plurality of circumferentially spaced electrical conductors defining an annular ring, the fourth conductor layer being positioned radially outwardly from the third conductor layer;
   a third insulator spacer formed of an electrically non-conductive material and interwoven between the third and fourth conductive layers by extending alternately between outer and inner surfaces of circumferentially adjacent electrical conductors of the third conductor layer; and
   a fourth insulator spacer formed of an electrically non-conductive material and interwoven between the third and fourth conductive layers by extending alternately between outer and inner surfaces of circumferentially adjacent electrical conductors of the fourth conductor layer.

9. The stator assembly of claim 8, wherein:
   the first conductor layer and the second conductor layer are interconnected to define a multi-phase inner winding set; and
   the third conductor layer and the fourth conductor layer are interconnected to define a multi-phase outer winding set positioned radially outwardly from the inner winding set.

10. The stator assembly of claim 1, wherein the insulator spacers comprise an endless loop extending circumferentially around the stator core.

11. A stator assembly comprising:
    a stator core;
    a plurality of electrical conductors supported within the stator core and extending axially between opposing first and second end portions, the first and second end portions positioned outside of the stator core, the plurality of conductors arranged in a plurality of concentric layers;
    a first elongated insulator spacer interwoven in a substantially sinusoidal path between the plurality of conductors proximate the second ends outside of the stator core, the insulator spacer formed of an electrically non-conductive material;
    the second end portions of the electrical conductors are bent to include an inner axial leg, an outer axial leg, and an inclined portion connecting the inner axial leg and the outer axial leg; and
    the insulator spacer is configured to engage the inclined portions of the electrical conductors.

12. The stator assembly of claim 11, wherein the insulator spacer comprises an endless loop extending circumferentially around the stator core.

13. The stator assembly of claim 11, further comprising a second elongated insulator spacer interwoven in a substantially sinusoidal path between the plurality of conductors proximate the second end portions outside of the stator core, the insulator spacer formed of an electrically non-conductive material.

14. The stator assembly of claim 13, wherein the plurality of concentric layers of the plurality of conductors includes:

a first conductor layer including a plurality of circumferentially spaced electrical conductors defining an annular ring; and a second conductor layer including a plurality of circumferentially spaced electrical conductors defining an annular ring, the second conductor layer being positioned radially outwardly from the first conductor layer.

15. The stator assembly of claim 13, wherein the first conductor layer and the second conductor layer are interconnected to define a multi-phase winding set.

16. The stator assembly of claim 13, wherein the first and second elongated insulator spacers alternate between opposing outer and inner surfaces of the conductors.

17. The stator assembly of claim 13, wherein the insulator spacer is formed of a cord of electrically insulating material having a substantially circular cross-section.

18. The stator assembly of claim 13, wherein the insulator spacer is formed of a strip of electrically insulating material having a substantially rectangular cross-section.

19. The stator assembly of claim 13, wherein the insulator spacer is formed of at least one of glass, polymer, and para-aramide fibers.

20. A stator assembly comprising:
a stator core;
a plurality of electrical conductors supported within the stator core and extending axially between opposing first and second end portions, the first and second end portions positioned outside of the stator core, the plurality of conductors arranged in a plurality of concentric layers;
a first elongated insulator spacer interwoven in a substantially sinusoidal path between the plurality of conductors proximate the second ends outside of the stator core, the insulator spacer formed of an electrically non-conductive material;
a second elongated insulator spacer interwoven in a substantially sinusoidal path between the plurality of conductors proximate the second end portions outside of the stator core, the insulator spacer formed of an electrically non-conductive material;

wherein the plurality of concentric layers of the plurality of conductors includes:
a first conductor layer including a plurality of circumferentially spaced electrical conductors defining an annular ring;
a second conductor layer including a plurality of circumferentially spaced electrical conductors defining an annular ring, the second conductor layer being positioned radially outwardly from the first conductor layer;
a third conductor layer including a plurality of circumferentially spaced electrical conductors defining an annular ring, the third conductor layer being positioned radially outwardly from the second conductor layer;
a fourth conductor layer including a plurality of circumferentially spaced electrical conductors defining an annular ring, the fourth conductor layer being positioned radially outwardly from the third conductor layer;
a third insulator spacer formed of an electrically non-conductive material and interwoven between the third and fourth conductive layers by extending alternately between outer and inner surfaces of circumferentially adjacent electrical conductors of the third conductor layer; and
a fourth insulator spacer formed of an electrically non-conductive material and interwoven between the third and fourth conductive layers by extending alternately between outer and inner surfaces of circumferentially adjacent electrical conductors of the fourth conductor layer.

21. The stator assembly of claim 20, wherein:
the first conductor layer and the second conductor layer are interconnected to define a multi-phase inner winding set; and
the third conductor layer and the fourth conductor layer are interconnected to define a multi-phase outer winding set positioned radially outwardly from the inner winding set.

* * * * *